(12) United States Patent
Berghus et al.

(10) Patent No.: US 7,357,402 B2
(45) Date of Patent: Apr. 15, 2008

(54) ARRANGEMENT FOR VIBRATION DAMPING IN A VEHICLE

(75) Inventors: Jürgen Berghus, Simmozheim (DE); Alexander Ender, Allmendingen (DE); Achim Weber, Köngen (DE); Thomas Wergula, Leonberg (DE)

(73) Assignee: DaimlerChrysler AG, Stuttgart (DE)

( * ) Notice: Subject to any disclaimer, the term of this patent is extended or adjusted under 35 U.S.C. 154(b) by 357 days.

(21) Appl. No.: 11/086,784

(22) Filed: Mar. 22, 2005

(65) Prior Publication Data

US 2005/0189735 A1 Sep. 1, 2005

Related U.S. Application Data

(63) Continuation-in-part of application No. PCT/EP03/09644, filed on Aug. 30, 2003.

(30) Foreign Application Priority Data

Sep. 24, 2002 (DE) ............................... 102 44 361

(51) Int. Cl.
*B60G 7/02* (2006.01)
(52) U.S. Cl. ............................................. 280/124.109
(58) Field of Classification Search ......... 280/124.109, 280/124.1, 124.125, 124.145, 124.154
See application file for complete search history.

(56) References Cited

U.S. PATENT DOCUMENTS 3,408,088 A * 10/1968 Corbin ................ 280/124.106
6,113,120 A * 9/2000 Heap ................... 280/124.135

FOREIGN PATENT DOCUMENTS

DE 2712083 9/1978
EP 0 683 088 11/1995
FR 2 813 273 3/2002

* cited by examiner

*Primary Examiner*—Eric Culbreth
(74) *Attorney, Agent, or Firm*—Klaus J. Bach

(57) ABSTRACT

In an arrangement for vibration damping in a vehicle, including a vehicle body with an auxiliary frame and support bearings for supporting a component on the auxiliary frame, wheels supported on the auxiliary frame by links and a spring-and-damper strut or a spring and damper supporting the vehicle body, a connecting device is provided in such a manner that a force flux circuit is formed wherein forces which are introduced into the vehicle by vibratory movements caused by the upward motions and the rebounding of the wheels are substantially absorbed in the force flux circuit.

15 Claims, 5 Drawing Sheets

ARRANGEMENT FOR VIBRATION DAMPING IN A VEHICLE

This is a Continuation-In-Part Application of International Application PCT/EP2003/009644 filed Aug. 30, 2003 and claiming the priority of German application 102 44 361.0 filed Sep. 24, 2002.

BACKGROUND OF THE INVENTION

The invention relates to an arrangement for vibration damping in a vehicle having a body with an auxiliary frame on which an axle is supported.

It is generally known in vehicles with chassis auxiliary frame axles to provide a support structure for an internal combustion engine. An apparatus of this type is described in DE 27 12 083 A1.

However, the mounting of components, such as for example an internal combustion engine, on the chassis auxiliary frame can impair ride comfort in certain driving situations if, during wheel spring compression, the mounted components are subjected to vibrations which are introduced into the body.

It is the object of the present invention to provide an arrangement wherein excitation of components which are mounted directly or indirectly on the auxiliary frame, as a result of spring compression and rebounding of the wheels, is effectively reduced and/or damped.

SUMMARY OF THE INVENTION

In an arrangement for vibration damping in a vehicle, including a vehicle body with an auxiliary frame and support bearings for supporting a component on the auxiliary frame, wheels supported on the auxiliary frame by links and a spring-and-damper strut or a springs and dampers supporting the vehicles body, a connecting device is provided in such a manner that a force flux circuit is formed wherein forces which are introduced into the vehicle by vibratory movements caused by the upward motions and the rebounding of the wheels are substantially absorbed in the force flux circuit.

One advantage of the invention is that a movement of the auxiliary frame in reaction to wheel spring compression or rebounding of a wheel is suppressed or at least greatly reduced so as to reduce undesirable excitation of components mounted on the auxiliary frame.

A further advantage is that the response of the chassis damping and therefore the handling are improved and the ride comfort is increased. Furthermore, spring stiffnesses of various supports that are present can be reduced, which in turn, provides for better ride comfort.

The invention will be described below in greater detail on the accompanying drawings:

DESCRIPTION OF VARIOUS EMBODIMENTS

Figure 1:
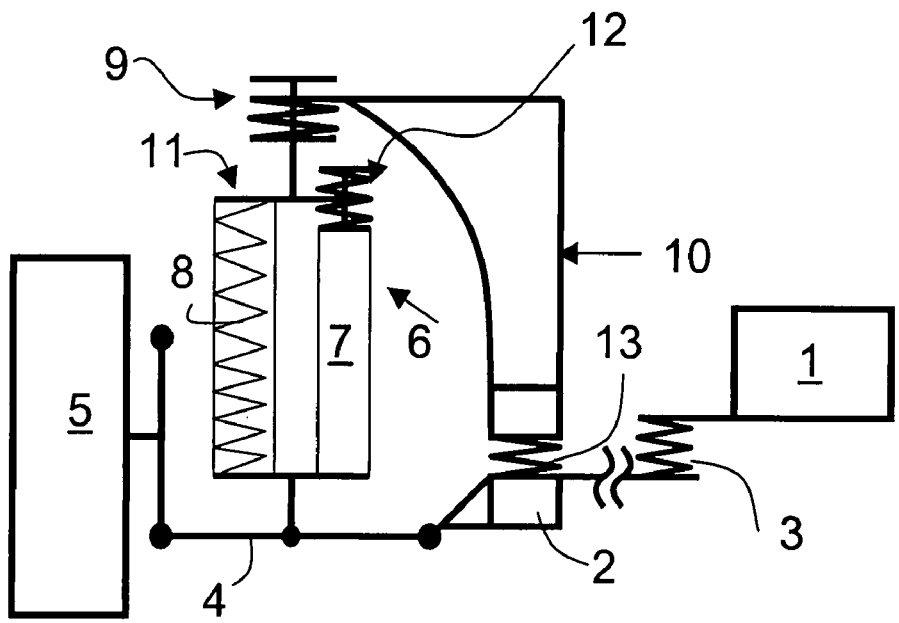
FIG. 1 diagrammatically depicts a known arrangement with spring-and-damper strut and mounting of the internal combustion engine on the chassis auxiliary frame without a rod.

The invention is especially suitable for vehicles with chassis auxiliary frame axles. Various components can be mounted directly or indirectly on the chassis auxiliary frame, e.g. a drive unit and/or axle components and/or other units. The invention is described on the basis of a vehicle in which an internal combustion engine is mounted on the chassis auxiliary frame; however, it is not restricted to this particular arrangement.

In the figures, corresponding or identical elements are designated by the same reference numerals.

FIG. 1 diagrammatically depicts a known arrangement for example for a front axle auxiliary frame. For reasons of clarity, only a left-hand part of a chassis auxiliary frame axle is shown, in order to provide a more detailed explanation of the behavior of the arrangement during compression of a wheel 5. A corresponding arrangement is continued mirror-symmetrically on the right-hand side of the figure as well. Overall, the view shows a wheel house. The engine compartment is arranged above and to the side of this wheel house.

A mounted component 1, for example an internal combustion engine, is mounted directly on a chassis auxiliary frame 2 via a component support or bearing 3. A link 4 is arranged between chassis auxiliary frame 2 and a wheel 5. The link 4 may be designed as a spring arm or a transverse arm. In the wheel house, a spring-and-damper strut 6 having a spring 8 and a damper 7 is disposed between the link 4 and a body 10. The spring 8 may be an air spring or steel spring. The spring-and-damper strut 6 is mounted on the body 10 by means of a head bearing 9. The head bearing 9 has a standard tension and compression stop as the upper and lower limiters for the movement of the head bearing 9. The damper 7 is mounted by means of a damper bearing 12 at the body-side end 11 of the spring-and-damper strut 6. The damper bearing 12 likewise has a tension and compression stop. A chassis auxiliary frame support 13 is arranged between the body 10 and chassis auxiliary frame 2.

Alternative configurations to the arrangement shown are also possible, for example an embodiment without head bearing 9 for the spring-and-damper strut 6 or the damper 7 and/or with the damper 7 linked directly to the body 10 rather than to the body-side end 11 of the spring-and-damper strut 6 (as shown below in FIGS. 4 and 5, respectively) and/or mounting of the mounted component 1 on the body 10. In the latter case, it is advantageously possible to reduce at least the axle vibrations.

Figure 2:
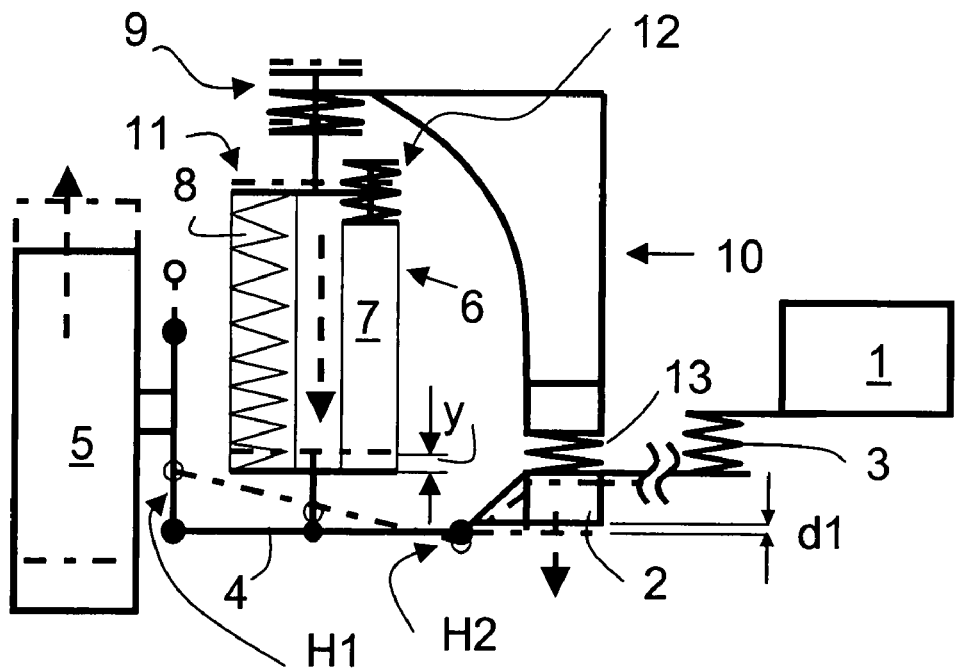
FIG. 2 shows the behavior of the arrangement shown in FIG. 1 during compression of the wheel spring, FIG. 3 diagrammatically depicts a preferred arrangement with spring-and-damper strut and mounting of the internal combustion engine on the chassis auxiliary frame with a rod in accordance with the invention, FIG. 4 diagrammatically depicts an arrangement for an axle which is not driven, with rod linking to the damper bearing within a spring strut, FIG. 5 diagrammatically depicts a further preferred arrangement, with rod attachment to the damper bearing fixed to the body, FIG. 6 diagrammatically depicts a refinement of the arrangement with a vibration-damping rod, FIG. 7 diagrammatically depicts a preferred refinement with attachment to the spring strut, FIG. 8 diagrammatically depicts an alternative configuration within the wheel house, FIG. 9 diagrammatically depicts a further alternative configuration with attachment within the engine compartment, and FIG. 10 diagrammtically depicts a preferred further alternative configuration with dome rod.

FIG. 2 explains how the individual components move with respect to one another during upward motion of the wheel 5. The movement of the wheel 5 is indicated by an upwardly directed dashed arrow (z direction). The wheel 5 moves the link 4 together with the wheel-side attachment and thereby lifts the link 4 by a distance H1. On the chassis auxiliary frame side, however, the link 4 is biased downward in the opposite direction and moves downward in the opposite direction by a distance H2 which is smaller than H1. Overall, the spring-and-damper strut 6 is lifted in the same direction as the wheel 5 (indicated by the dashed lines at the spring-and-damper strut 6). The spring-and-damper strut lifting y leads to an opposing force (dashed arrow pointing downward) and corresponding damping in the spring-and-damper strut 6. The deflection of the link 4 downward also deflects the chassis auxiliary frame 2 downward by the distance d1, which in turn acts on the component 1. During rebounding of the wheel 5, the movements of the individual components are correspondingly reversed.

The spring forces, the upward movement and rebounding of the wheel 5 causes more or less undamped relative movements between chassis auxiliary frame 2 and the body 10, as long as there are no hydraulically damping bearings used in the z direction as chassis auxiliary frame bearings 13. Conventional engine bearings, which function as component supports 3 for an internal combustion engine, and chassis auxiliary frame bearings 13 usually have only a low damping component, depending on the choice of material, which can result in undesirable vibrations in the mounted component 1, which therefore is affected by the wheel movements.

According to the invention, undamped or damped relative movements of this nature between the chassis, the auxiliary frame 2 and the body 10 are greatly reduced or even eliminated altogether by a connecting device which routes the forces produced by deflections of the wheel 5 in such a way as to form a continuous force flux circuit of components in the axle assembly.

The connecting device preferably causes a change in distance between a bearing 9, 12 of the spring-and-damper strut 6 and the chassis auxiliary frame 2 to be restricted to minor changes or even eliminated altogether. In the exemplary embodiment shown, the connecting device comprises a rod 20.

The deflections at the bearing 9 and the chassis auxiliary frame 2 are oppositely directed, and their amplitude is dependent, inter alia, on the respective bearing strength of the bearing 9 and the chassis auxiliary frame bearing 13.

Figure 3:
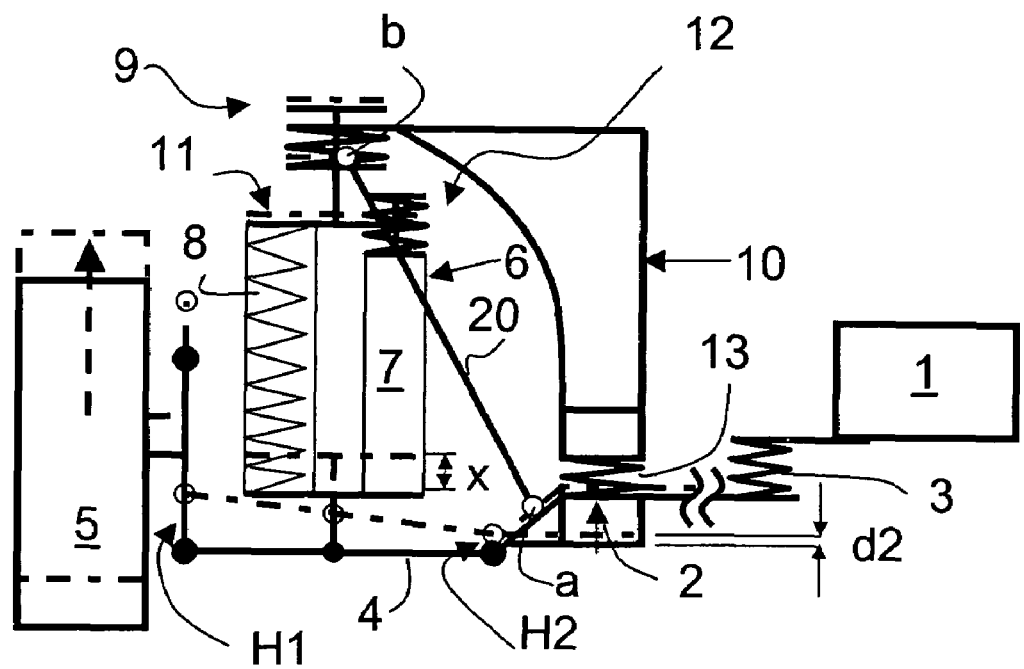

FIG. 3 illustrates a principle of operation of the invention. A rod 20, which limits or eliminates a change in distance between bearing 9, 12 and chassis auxiliary frame 2, is arranged as a connecting device between the head bearing 9 of the spring-and-damper strut 6 and the chassis auxiliary frame 2. In this exemplary embodiment, the rod 20 is designed as a fixed rod. The rod has an upper and lower end point b, a with elastic bearings and fixes the distance between head bearing 9 and chassis auxiliary frame 2. Consequently, in the event of upward movement of the wheel 5 (as indicated by the dashed arrow), the relative movement of the chassis auxiliary frame now takes place in the z direction but in the opposite sense to the movement described in FIG. 2. The chassis auxiliary frame 2 is no longer deflected downward, but rather at most moves a distance d2 upward in the z direction; the magnitude of this distance substantially depends on the bearing strength at the rod ends a, b. Likewise, any deflection H2 of the link 4 on the chassis auxiliary frame side is now directed upward.

Furthermore, the damper travel becomes greater, as can be recognized from the deflection x, which may be greater than the travel y from FIG. 2. The result of this is greater wheel damping and an improved response on the part of the damper 7. This also suppresses the mutually opposite deflection, discernible in FIG. 2, at the head bearing 9 and at the chassis auxiliary frame 2.

Arranging the connecting device or the rod 20 between chassis auxiliary frame 2 and head bearing 9 results in the spring stiffnesses of all the bearings arranged between the securing points a, b of the rod 20 being connected in parallel. This parallel connection, in the arrangement shown, accordingly results in the spring stiffnesses of the chassis auxiliary frame bearing 13, the head bearing 9, the damper bearing 12 and spring 8 acting cumulatively. It is also possible to provide further bearings, the spring stiffnesses of which can then also be added accordingly. This parallel connection changes the natural frequency of the overall system. Therefore, there is an increased potential for increasing the vibration damping and comfort, since individual bearing strengths of the parallel-connected bearings 13, 9, 12, 8 can be reduced compared to a situation without a connecting device.

The introduction of forces caused by wheel force fluctuations at the head bearing 9 is reduced. This advantageously leads to less noise being introduced into the vehicle and also in better running characteristics. Furthermore, the strengths of the bearings can be varied in a targeted way in order to optimally match the bearings to one another.

Any settling on the part of the chassis auxiliary frame bearing 13 in the z direction, for example with increasing service life, is now negligible. This leads to a reduction in bending angle fluctuations in the drive train, in particular fluctuations in the drive shaft bending angles.

With the connecting device, there is no loss of damper travel. The mass of the supported component 1 acts as an additional mass of inertia. If a steering mechanism (not shown) is secured to the chassis auxiliary frame 2, any steering wheel torsional vibrations are also reduced.

Figure 4:
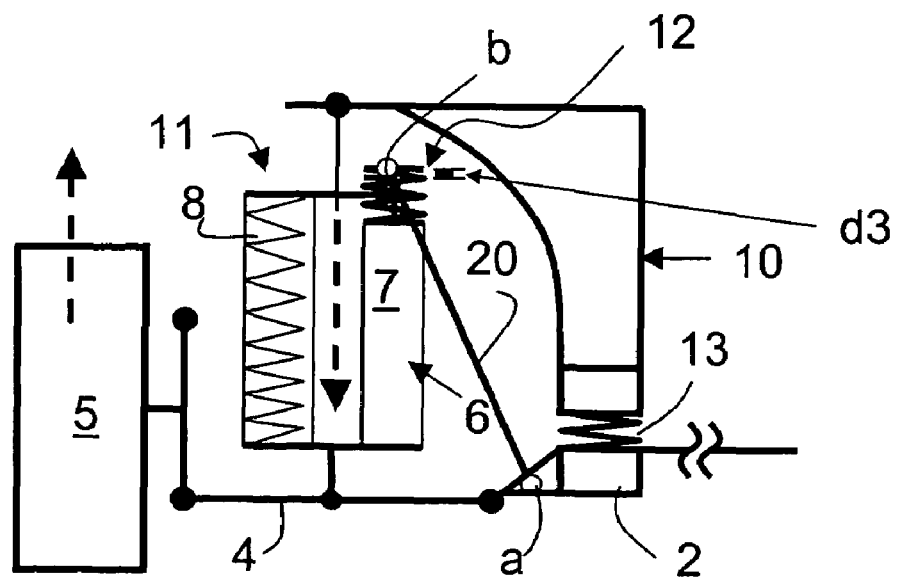

A further expedient configuration of the invention for use on a spring strut without head bearing is illustrated in FIG. 4. A component 1 may or may not be mounted on the chassis auxiliary frame 2. The spring-and-damper strut 6 is now secured directly to the body 10, rather than via a head bearing 9.

A rod 20 is in this case arranged as a connecting device between chassis auxiliary frame 2 and the damper bearing 12 of the damper 7 of the spring-and-damper strut 6. The upper end point b of the rod 20 on the damper bearing 12 is secured to the tension stop at the upper end of the damper bearing 12 and is thereby connected to the piston rod of the damper 7. Arranging the rod 20 between chassis auxiliary frame 2 and the damper bearing 12 reduces the tensile forces in the rod 20 on account of the "missing" contribution of the spring 8. Although the damper forces which occur mean that the chassis auxiliary frame 2 can once again move downward, these movements additionally act on the wheel damper 7 and are thereby damped. This can be recognized from the fact that an additional damper travel d3 is established in the upper region of the damper 7.

Any dynamic force peaks which are introduced into the body 10 are reduced, which advantageously improves the running noise.

The advantages mentioned in the exemplary embodiments described above also apply accordingly to this arrangement.

Figure 5:
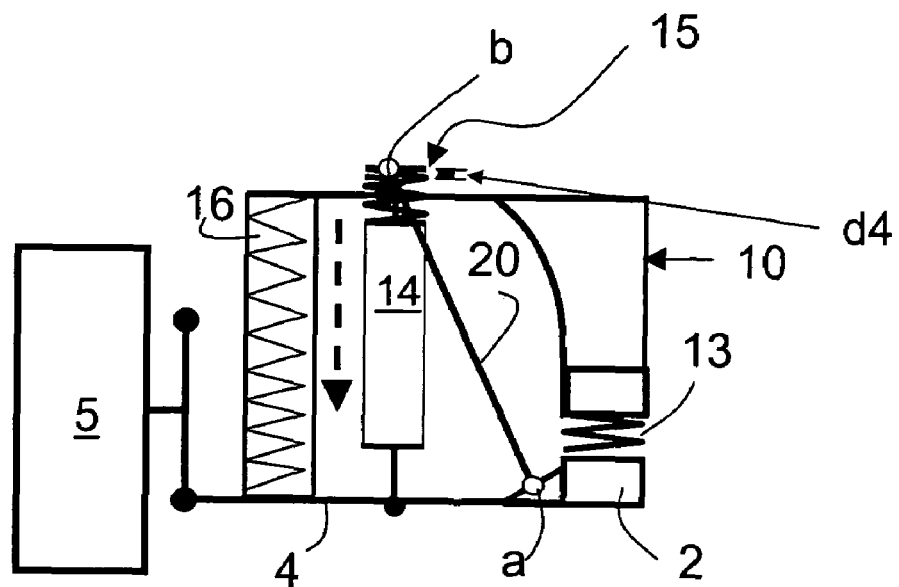

A further expedient configuration of a use for a damper 14 is illustrated in FIG. 5. In this case, a separate spring 16 and a separate damper 14, which is mounted on the body 10 by means of a damper bearing 15, are provided instead of a spring-and-damper strut 6. As in FIG. 4, an additional damper travel d4 is in this case available as a result of the rod 20 being arranged between chassis auxiliary frame 2 and the piston rod of the damper 14.

The connecting device, in particular in the form of a rod 20, also offers the option of in each case making the individual spring stiffnesses connected in parallel by the connecting device or rod 20 softer, which in turn improves comfort. Furthermore, in an embodiment in accordance with FIG. 3, if the spring stiffnesses become lower, there is additionally the potential of an inexpensive design of the bearing 3 for the mounting component 1, in particular for an engine bearing.

The rod 20 is preferably a fixed bar which is of correspondingly stable design. For example, its spring stiffness can be made at least equal to the spring stiffnesses of the bearings 8, 9, 12, 13 which are connected in parallel by it. The rod 20 is preferably attached to the head bearing 9 and to the chassis auxiliary frame 2 by means of elastic elements. Furthermore, the rod may also be prestressed in order to vary bearing loads on the chassis auxiliary frame bearing 13 and head bearing 9.

The load on bearings which are present is reduced, which is likewise of benefit to the service life of these bearings. Forces introduced into the body 10 are likewise reduced, with the result that the service life of the body is also favorably influenced.

An additional advantage of an arrangement with connecting device of this type is that in the event of a crash kinetic energy can additionally be introduced into the body 10 via the rod 20. In the event of a crash in the front region of the vehicle, the front end is deformed and the chassis auxiliary frame 2 moves backward. The rod 20 also moves backward, so that kinetic energy can be transferred from the lower region into the upper region of the body 10.

Figure 6:
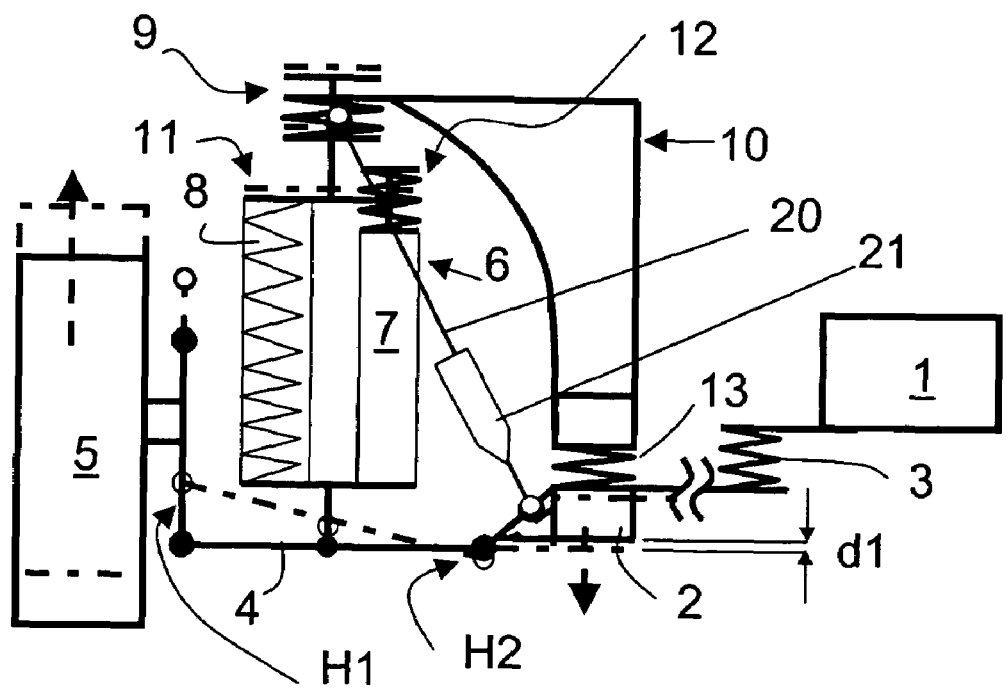

An expedient configuration of the invention is illustrated in FIG. 6. The arrangement substantially corresponds to that shown in FIG. 3. In addition to the arrangement shown in FIG. 3, the connecting device now also has vibration damping means 21; in particular, a rod 20 may be designed as a damper. As a result, the chassis auxiliary frame 2 is once again attached to the head bearing 9. In this case, however, the opposite deflections d1 at the chassis auxiliary frame bearing 13 and at the head bearing 9 are damped. The damper travel can be influenced, for example, by changes in the bearing strength of the head bearing 9 and of the chassis auxiliary frame bearing 13.

Figure 7:
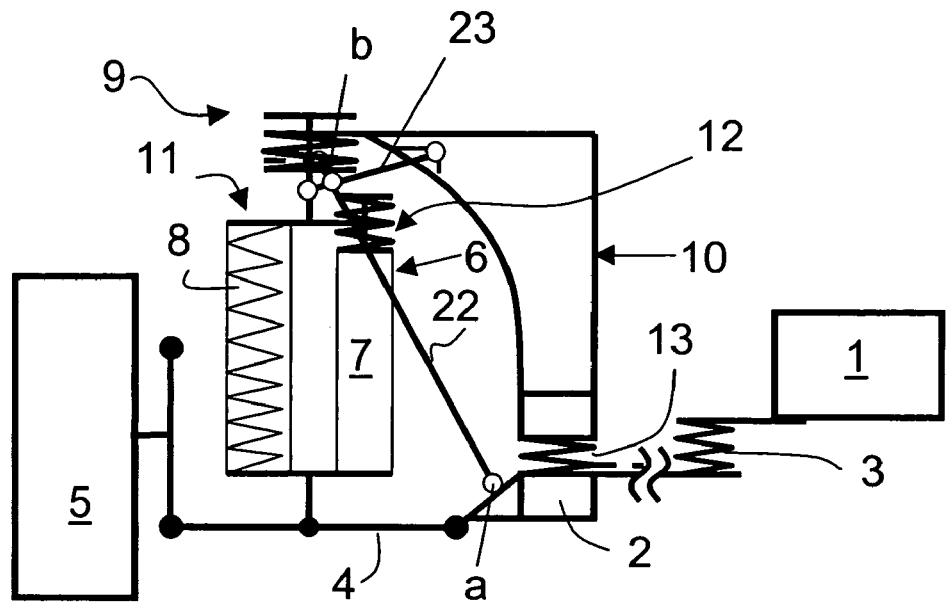

A further preferred configuration of the invention is illustrated in FIG. 7. This figure illustrates the connecting device attached to the spring-and-damper strut 6 without any transverse forces. An additional rocker 23 is supported on the body side within the wheel house of the body 10 and connects the body 10 to the spring-and-damper strut 6. A rod 22 is connected to the additional rocker 23 in the vicinity of the head bearing 9. In this way, the spring-and-damper strut 6 is protected from undesirable additional spring strut transverse forces.

Figure 8:
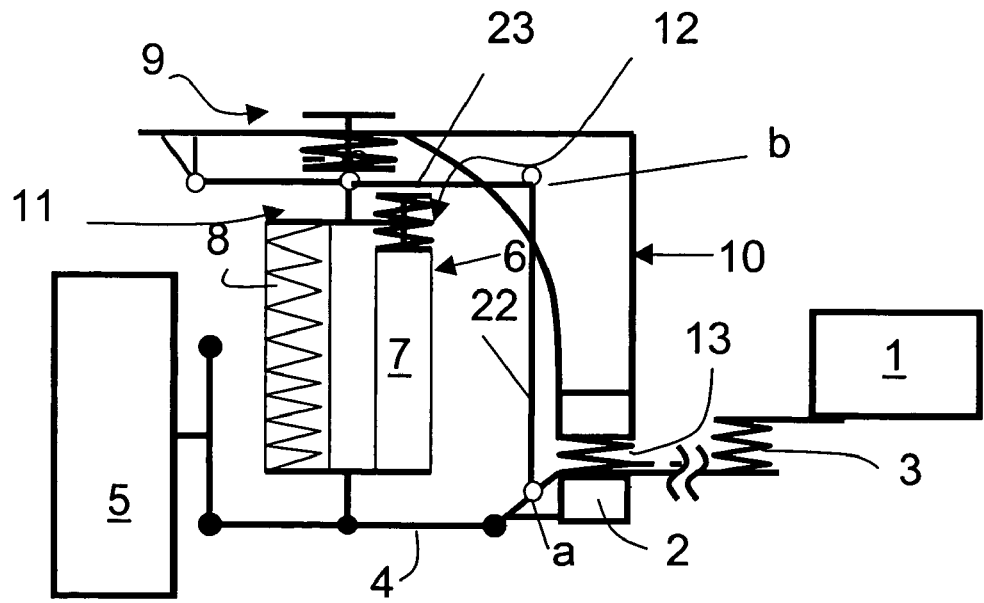

FIG. 8 also shows a preferred configuration of the invention without transverse forces. This figure illustrates an alternative way of attaching a rod 22 to the spring-and-damper strut 6. An additional rocker 23 is supported on the body side within the wheel house of the body 10. The rod 22 is in this case connected to the additional rocker 23 in the vicinity of the wheel house of the body 10. The additional rocker 23 connects the rod 22 to the head bearing 9.

Figure 9:
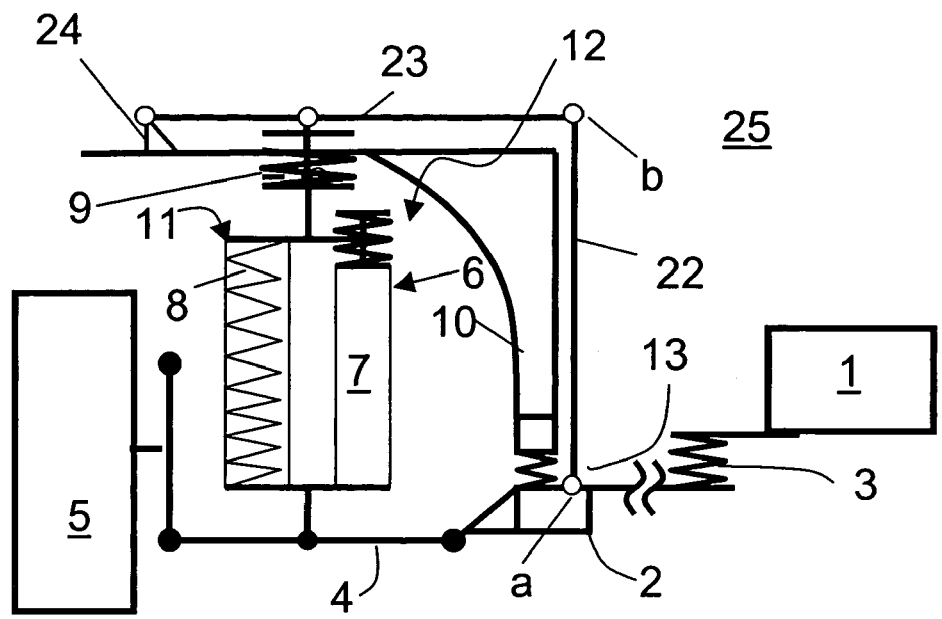

A further preferred configuration of the invention is illustrated in FIG. 9. This figure illustrates a rod 22 attached to the spring-and-damper strut 6 without any transverse forces; in this arrangement, an additional rocker 23 is supported on the body side within the engine compartment 25. The rod 22 is in this case connected to the additional rocker 23 in the vicinity of the wheel house of the body 10. The additional rocker 23 connects the rod 22 to the head bearing 9 and extends above the head bearing 9. The additional rocker 23 is supported against the body 10 by means of an abutment 24. This variant is compact and allows the system to be packaged in a favorable way by utilizing free volume in the engine compartment 25.

Figure 10:
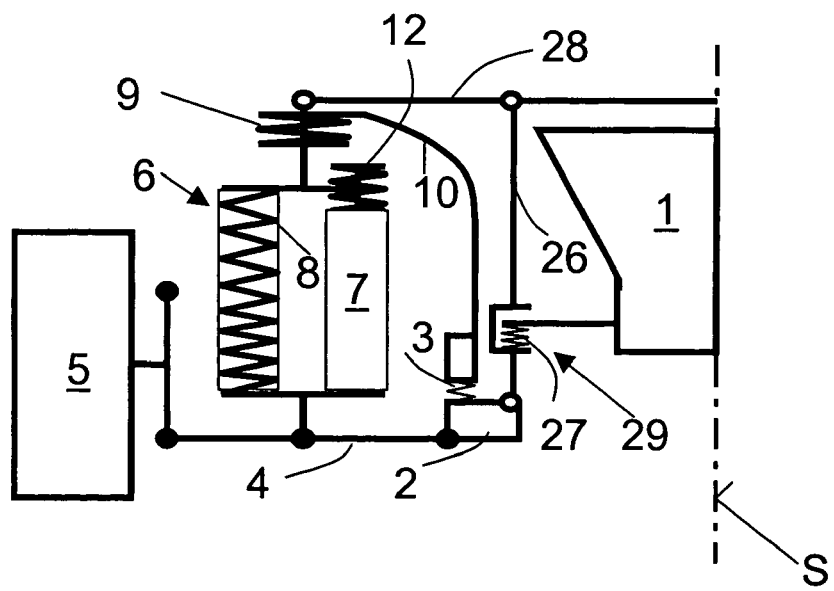

FIG. 10 shows a particularly preferred configuration of the connecting device, which comprises a dome rod 28 and a rod 26 on each side of the axle. A mounted component 1 may be mounted directly on a chassis auxiliary frame 2 or, as illustrated, on the rod 26 by means of a bearing 27, in which case a corresponding bearing receiving part 29 is formed at the rod 26. The bearing 27 preferably has spring and damping properties.

The dome rod 28 runs between head bearings 9 of a spring-and-damper strut 6 belonging to the axle. The dome rod 28 is not fixed to the body, but rather connects the two head bearings 9 arranged on the two sides of the axle. In the engine compartment 25, the rod 26 extends upward from the chassis auxiliary frame 2 to the dome rod 28, where it is connected to the latter. The arrangement shown continues in mirror-symmetrical form on the right-hand side. It is expedient in this context that no transverse forces are applied to the damper 7 of the spring-and-damper strut 6.

One advantage of the connecting device, in particular of the rod 20, 22, 26, is that all the forces introduced by the wheel movement are better supported within the axle assembly, preferably composed of the link 4, in particular, the transverse link, the spring-and-damper strut 6, the connecting device and the chassis auxiliary frame 2, and therefore the forces acting on the body-side attachment points of the axle assembly are considerably reduced.

What is claimed is:

1. An arrangement for vibration damping in a vehicle having a body (10), an auxiliary frame (2) on which a component (1) is supported and wheels (5) supported on the auxiliary frame (2) by way of guide arms (4) and damping devices (6, 14), and a connecting device (20), by means of which the auxiliary frame (2) is linked to a bearing (9, 12) one of the damping devices (6, 14) for the purpose of reducing relative movements between the body (10) and the auxiliary frame (2).

2. An arrangement as claimed in claim 1, wherein at least two bearings (8, 9, 12, 13, 15) selected from the group consisting of a head bearing (9) of a spring-and-damper strut (6), damper bearings (12, 15) of a damper (14), spring (8) of a spring-and-damper strut (6), and an auxiliary frame bearing (13) are connected in parallel by the connecting device.

3. An arrangement as claimed in claim 1, the connecting device (20) links the auxiliary frame (2) substantially rigidly to the bearing (9, 12, 15) to which of the said one damping device (6, 14).

4. An arrangement as claimed in claim 3, wherein the connecting device (20) links the chassis auxiliary frame (2) to a head bearing (9).

5. An arrangement as claimed in claim 3, wherein the damping device (5) is supported on the vehicle body by a head bearing (9) and the connecting device links the auxiliary frame (2) to a damper bearing (12, 15).

6. An arrangement as claimed in claim 1, wherein the connecting device is linked to the damping device (6, 14) substantially without any transverse forces.

7. An arrangement as claimed in claim 1, wherein the connecting device comprises a rigid rod (20, 22, 26).

8. An arrangement as claimed in claim 7, wherein the connecting device comprises at least one additional rocker (23, 24), which indirectly connects the rod (20, 22, 26) to one of a head bearing (9) and a damper bearing (12).

9. An arrangement as claimed in claim 7, wherein the rigid rod (22), on the body side, is supported within an engine compartment.

10. An arrangement as claimed in claim 8, wherein the rigid rod (22), on a body side, is supported within a wheel house.

11. An arrangement as claimed in claim 7, wherein the rigid rod (20, 22, 26) is provided with elastic bearings at its ends (a, b).

12. An arrangement as claimed in claim 7, wherein the rigid rod (20, 22, 26) is placed under prestress.

13. The apparatus as claimed in claim 7, wherein the rigid rod (20, 22, 26) has vibration-damping means (21).

14. An arrangement as claimed in claim 1, wherein the connecting device comprises a dome rod (28), which extends between the head bearings (9, 12) of one axle and which connects a rod (26) to the chassis auxiliary frame (2) on each side of a line of symmetry (S).

15. An arrangement as claimed in claim 14, wherein the component (1) is mounted on a bearing receiving part (29) of the rod (26).

* * * * *